United States Patent [19]
Magill

[11] 4,050,891
[45] Sept. 27, 1977

[54] HEAT TRANSFER BLACK DYESTUFF A

[75] Inventor: Jacques R. Magill, Milton, N.J.

[73] Assignee: Crompton & Knowles Corporation, New York, N.Y.

[21] Appl. No.: 751,748

[22] Filed: Dec. 17, 1976

[51] Int. Cl.² .................. D06P 1/20; C09D 11/00
[52] U.S. Cl. .................................. 8/2.5 R; 8/25;
8/26; 8/2.5 A; 8/39 C; 8/41 C; 8/179; 106/22
[58] Field of Search .................. 8/2.5 RA, 25, 26;
106/22

[56] References Cited
U.S. PATENT DOCUMENTS

| 1,938,029 | 12/1933 | Kugel | 260/377 |
| 3,888,623 | 6/1975 | Clarke et al. | 8/25 |
| 3,893,801 | 7/1975 | Vellins et al. | 8/39 |

Primary Examiner—Joseph L. Schofer
Assistant Examiner—A. L. Clingman
Attorney, Agent, or Firm—William H. Elliott, Jr.

[57] ABSTRACT

A black dyestuff composition useful for heat transfer printing of polyester textile which is made up of a compatible mixture of a brown azo dye and a blue anthraquinone dye.

19 Claims, No Drawings

HEAT TRANSFER BLACK DYESTUFF A

This invention relates to a composition of matter, namely a black dyestuff that is useful in heat transfer, printing of synthetic textile fabrics, to transfer sheets carrying such compositions and adapted for use in heat transfer printing of textile fabrics, to inks that are useful in making such transfer sheets, to an improved process using said composition and said transfer sheets for the heat transfer printing of polyester fabrics, and to the printed or dyed fabrics produced thereby.

Various techniques (such as melt transfer and wet transfer) have heretofore been used to produce transfer prints but they have not been widely utilized in commercial fabric printing operations. In the late 1950's the French firm, Filatures Prouvost Masurel et Cie, pioneered the development of a dry transfer printing process, referred to variously as the vapor-phase process, the dry heat process or the sublimation process; the use of this process is in a stage of continuing rapid growth and it is described in great detail in published literature and patents — e.g., British Specification No. 1,189,026 discloses an early embodiment of the process.

In this application the terms "thermal transfer process" and "heat transfer process" will be used interchangeably, but shall only refer to the sublimation or vapor-phase process of printing or dyeing synthetic textiles wherein the textiles are colored with water-insoluble dyestuffs that undergo sublimation at temperatures below that at which the physical integrity of the textile is impaired. The dyeing or printing is carried out by printing a substrate (usually paper or a sheet of non-textile material) in an all-over or discontinuous pattern with an ink that contains the sublimable dyestuff. The printed substrate and the textile to be dyed or printed are brought into contact under controlled conditions of time, temperature and pressure whereby the dye on the substrate is caused to sublime or be vaporized onto the surface of the textile to penetrate into the fibers and to be entrained therein. Thereafter, the substrate and the dyed or printed textile are separated.

Also, as used herein the following terms shall hereafter be deemed to have the following meanings:
  a. "heat transfer prints" shall be construed as referring to dyeings or pattern effects produced by the heat transfer process.
  b. "Pattern effects" shall be construed as referring to continuous (all-over) effects as well as discontinuous (localized) effects.
  c. "Textile" shall be construed as referring to fabric (in web form or as piece goods), to nonwoven materials and to finished articles made from such products.
  d. "Polyester" shall be construed as referring to textiles made entirely or predominantly of polyester fibers.
  "Transfer sheet" shall be construed as referring to a non-textile substrate (normally, but not necessarily, paper) in sheet, roll or web form having a pattern effect printed thereon with a dried film of an ink formulation adapted for use in the heat transfer printing of synthetic textiles.
  f. "Compatible dyestuffs" and "compatible sublimable dyestuffs" shall be construed as meaning water insoluble disperse dyes or pigments or flourescent brightners that have essentially the same sublimability and thermal transfer characteristics, desirably they should be of about the same energy level and transfer at about the same rate under the same operating conditions.

Black dyestuffs usually are not self shade dyes but are compound colors made by mixing two or more dyes capable of providing a full color spectrum. In blending dyestuffs to give a compound color all of the mixed color components should be compatible i.e., of about the same energy level and exhibit substantially the same volatity and transfer properties.

If the blended dyes are not compatible, the dye component of the lower energy level will transfer more rapidly than the dye or dyes that have the higher energy level, and the face and back of the fabric being printed will be of differing hues; the fabric back (i.e., the fabric surface that is not in direct contact with the printed surface of the transfer sheet will, to the extent that it is colored, reflect the hue of the lower energy dye and the fabric face will reflect the hue of the dye with the higher energy level. To illustrate, assume a black dyestuff can be made by mixing a blue dye and a brown dye in a 1:1 ratio. If the blue dye and brown dye are of the same energy level, the face of the fabric printed by the heat transfer process with the black mix will develop in a black tone representing the 1:1 ratio of the mix and the back of the fabric will also exhibit the same 1:1 ratio black tone but will be of considerable less depth or intensity. However, if the brown dye is a lower energy dye than the blue dye, the brown dye will penetrate the fabric more rapidly than the blue dye in the heat transfer operation and the dyes carried by either the face or the back of the fabric will not be in the 1:1 ratio; the back will have a brownish cast and the face a bluish cast.

Aesthetically, textile designers and converters prefer heat transfer printed fabrics where the face and back are "on tone" colors rather than "off-tone"; the ontone colored fabrics are more marketable and command a premium price since greater control must be exercised in their production.

Even where the mixed dyes have substantially the same energy level, it is important to employ dye components that also have substantially parallel transfer rates over a wide range of operating conditions. If this is not the case offshade color development can result from relatively minor variations of the time and temperature of processing.

Furthermore, with most of the compound black heat transferrble dyestuffs, the dyeings prepared therefrom tend to exhibit a relatively low order of light fastness. This is due to the fact that black mixes usually include substantial quantities of a sublimable blue dye, and heat transfer prints made with the vast majority of sublimable blue dyes have poor light fastness. In most cases involving compound colors, the light fastness of dyeings or prints made from the color mix will be no greater than that of comparable depth dyeings or prints in a self shade of the dye component producing prints of the lowest light fastness, provided it represents a substantial part of the mix; in the case of compounded blacks this is usually the blue component.

Accordingly, it is an object of this invention to provide a composition of matter in the form of a compound dyestuff that can be used to impart jet black tones to polyester fibers in the thermal transfer printing process; the black prints having unusual light fast properties and exhibiting uniform color transference and ontone build up on both the face and back of the processed fabric; and a dyestuff that uniformly develops and maintains shade over a wide range of time and temperature conditions in the commercial operating range.

It is another object of the present invention to provide an improved thermal transfer printing process to impart pattern effects to polyester textiles that exhibit unusual light fastness properties, uniform color transference, and ontone build up over a wider range of operating conditions that can be used with conventional heat transferable compound black dyestuffs.

It is another object of this invention to provide improved thermal transfer sheets for use in the aforesaid improved thermal transfer process.

It is yet another object of the invention to provide printing inks that are useful in making the aforesaid transfer sheets.

It is a still further object of this invention to provide improved light fastness to black heat transfer dyed or printed polyester textile.

Other objects and advantages of the invention will be apparent from the ensuing description and the appended examples.

The objects and advantages of this invention are achieved by a dyestuff composition wherein the dyestuff comprises 20 to 80 parts of a brown dye of the formula

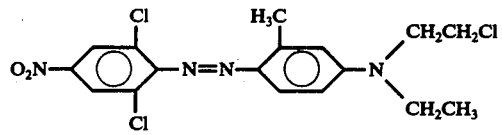

(hereinafter this dye is sometimes referred to as Brown A) and 80 to 20 parts of a blue dye having the formula

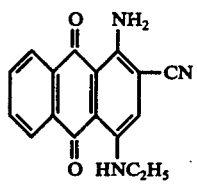

(hereinafter this dye is sometimes referred to as Blue A); by the manufacture of transfer sheets incorporating said composition; by ink formulations containing said composition; and by the novel textile produced by the heat transfer process wherein black tones are provided by said composition.

Brown A can be prepared by conventional diazotination and coupling reactions by diazotizing 2,6 -dichloro- - 4-nitroaniline and coupling the diazo to N -(2-chlorethyl)-N-ethyl-m-toluidine.

Blue A is known to be a sublimable blue dye that is useful in heat transfer printing (See U.S. Pat. No. 3,893, 801) and it can be prepared by following the procedures described in U.S. Pat. No. 1,938,029.

The Transfer Black A dyestuffs of this invention can be prepared by admixing Brown A and Blue A in the specified proportions and grinding them to a particle size that can readily be dispersed in the ink vehicle - preferably less than 3 microns in size. Alternatively, the Transfer Black A dyestuffs of this invention can be prepared in situ by separately or sequentially adding the brown and blue dyes to an ink base formulation and grinding the mix to provide the desired particle size.

The quantities of the brown and blue dye components needed to produce jet black tones on polyester textiles by a heat transfer process will vary depending on the particular method used to print the transfer sheet or substrate. Where the ink is deposited on the transfer sheet in a thin film the amount of blue dye needed to give a jet black transfer print will be less than that needed to provide jet black transfer prints from transfer sheets printed in a thicker ink film.

Thus when the transfer sheet is to have printed pattern that is to transfer black tones and the sheet is to be gravure printed with a black ink, 30 to 40 parts of the Brown A and 70 to 60 parts of Blue A should be used to make 100 parts of Transfer Black A. The optimum transfer Black A composition for transferring jet black coloration to polyester textile is obtained with a mixture consisting of 35 parts of the Brown A to 65 parts of the Blue A.

When the transfer sheet is to be printed by an offset process with an ink containing Transfer Black A dyestuff, a much more viscous ink is used and a much thinner ink film is deposited on the transfer sheet. In such cases the amount of the blue dye component in the composition must be decreased or the transfer print will exhibit a navy blue hue. With offset printed transfer sheets, good heat transferrable jet black tones will be obtained where the mix contains about 55 to 45 parts of Brown A and about 45 to 55 parts of Blue A. Optimum results are obtained with offset links containing a mixture of 50 parts of Brown A and 50 parts of Blue A.

When a Transfer Black A dyestuff of this invention is used in conjunction with other ink systems on transfer sheets carrying patterns printed, all the sublimable dyes and optical brightners carried on the transfer sheet should be compatible with Transfer Black A dyestuffs.

In making the ink formulations of this invention the Transfer Black A dyestuff can either be premixed and dispersed in the ink base or the individual color components can be added in the desired amounts and dispersed either simultaneously or sequentially in the ink base in a conventional manner. The ink base formulation includes a vehicle (of either the aqueous, solvent or oil base type) and a film forming binder and is adapted to the type of printing operation to be used in printing the transfer sheet. The printing of the transfer sheet with the ink formulation is carried out in a conventional manner for example by gravure, flexographic, lithographic offset or rotary screen techniques. Except as noted with respect to the varying the ratio of the brown and blue component concentration with the printing process, the problems incident to paper selection and to the manufacture and formulation of ink bases (including the selection of appropriate vehicles, solvents, binders, thinners, etc. used to make the ink base) that are suitable for use in the printing of the heat transfer substrates by the various printing techniques are all well understood in the art and no special or unique problems arise by virtue of the use of the Transfer Black A or the separate dye components thereof.

The following example will illustrate the various aspects of the invention, namely: (a) an ink formulation (a solvent type vehicle — for gravure printing); (b) the transfer sheet and (c) the improved heat transfer process.

EXAMPLE I a. A gravure ink with a visocisity of 22 seconds on a #2 Zahn cup, was made by blending 20 parts of Transfer Black A (a dyestuff made up of 35 parts Brown A 65 parts Blue A) with 80 parts of an ink base (composed of 8 parts ethyl cellulose as the binder and 72 parts of a vehicle (80% by weight ethanol and 20% by weight toluol) and grinding the ingredients in a shot mill to a particle size under 3 microns.

b. To make the transfer sheet, the resulting ink was printed on a standard gravure base paper stock using a Geiger laboratory gravure proofing press with an engraved cylinder at 150 cells/linear inch. The printed transfer sheet was allowed to dry.

c. An undyed piece of 100% texturized polyester fabric was placed on the printed face of the dried transfer sheet. The composite was positioned between two platens with the unprinted side of the transfer sheet in contact with the heated surface of the platten and was under conventional heat transfer operating pressure and heated for 30 seconds at 205° C. Thereafter the fabric and used transfer sheet were separated. The polyester fabric was dyed on its face in a jet black hue of good tinctorial strength and excellent fastness properties. The back of the fabric was of low depth but was an ontone hue of the black on the face of the fabric.

All fastness tests were conducted in accordance with AATCC Standard Test Methods as follows:

Light Fastness — Xenon-AATCC Test Method 16E-1971 and Fade-O-Meter AATCC Test Method 16A-1971.
Wash Fastness — Test # 2A — AATCC Test Method 61-1972.
Dry Cleaning — AATCC Test Method 132-1973.
Sublimation Test — AATCC Test Method 117-1973.
Prespiration — Test specimens were evaluated for resistance to acids and alkali by AATCC Test Method 15-1973.
Crocking — AATCC Test Method 8-1972.

The results are tabulated below. The table gives numerical values to the tests described above, using the usual AATCC numerical ratings running from 5 to 1; in which 5 represents no or negligible change, 4 represents a slight change, 3 represents a noticeable change and 1 represents much change.

TABLE I

| Light | | | | |
|---|---|---|---|---|
| Fade-O-Meter | (4–5 at 140 hours) | | | |
| Xenon | (5 at 140 hours) | | | |
| | #2A Wash | Dry Cleaning | Acid | Perspiration Alkaline |
| Alteration | 4 | 4–5 | 5 | 4–5 |
| Staining | | | | |
| Acetate | 4 | 5 | 4–5 | 4–5 |
| Cotton | 5 | 5 | 5 | 5 |
| Nylon | 3 | 5 | 4–5 | 5 |
| Dacron (Polyester) | 5 | 5 | 5 | 5 |
| Wool | 5 | 5 | 5 | 5 |
| Orlon | 5 | 5 | 5 | 5 |
| Crock Test | | | | |
| Wet | 4 | | | |
| Dry | 3–4 | | | |
| Sublimation | | | | |
| 340° F/30" | 3 | | | |
| 385° F/15" | 2–3 | | | |

Other testing has shown that the light fastness of heat transfer prints made with other compound black dyestuffs is relatively poor in that transfer prints of comparable depth show a break rated at 4–5 after about 20 to 30 hours exposure in standard Fade-O-Meter Light tests. Whereas, the light fastness of comparable heat transfer prints made with a gravure printed transfer sheet with an ink containing the transfer Black A dyestuff of this invention containing 65 parts Blue A and 35 parts Brown A is considerably greater; showing a 4–5 rated break only after an exposure of 140 hours. This enhancement is entirely unexpected since the light tests of a comparable depth self shade transfer print with both Blue A alone and Brown A alone show poorer light fastness than do the comparable depth transfer prints with Transfer Black A; Blue A shows a break rated at 4 after only 20 hours exposure and it was the major color component present in the mix and Brown A shows a break rated at 4 at 90 hours exposure.

Although the application is primarily directed to the transfer printing of polyester textiles, the invention also comprehends heat transfer printing onto any polyester or polyester coated substrate (herein sometimes collectively referred to as "polyester substrates").

I claim:

1. A dyestuff composition composed of 20 to 80 parts of a brown dye of the formula

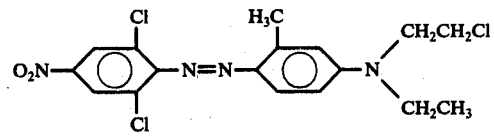

and 80 to 20 parts of a blue dye of the formula

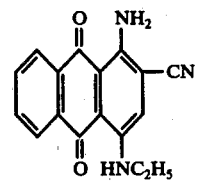

2. A dyestuff composition according to claim 1 wherein 100 parts of the dyestuff contain from 30 to 40 parts of the brown dye and from 70 to 60 parts of the blue dye.

3. A dyestuff composition according to claim 1 wherein 100 parts of the dyestuff contain about 35 parts of the brown dye and about 65 parts of the blue dye.

4. A dyestuff according to claim 1 wherein 100 parts of the dyestuff contain about 50 parts of the brown dye and about 50 parts of the blue dye.

5. A transfer sheet comprising a flexible nontextile substrate in sheet, roll or web form having a pattern effect thereon, said pattern being formed by a film of a dried ink formulation adapted for heat transfer printing of polyester substrates and wherein the ink film contains the dyestuff of claim 1.

6. A transfer sheet comprising a flexible nontextile substrate in sheet, roll or web form having a gravure printed pattern effect thereon, said pattern being formed by ink formulation adapted for use in the heat transfer printing of polyester substrates and wherein said film contains the dyestuff of claim 2.

7. A transfer sheet comprising a flexible nontextile substrate in sheet, roll or web form having a gravure printed pattern effect thereon, said pattern being formed by ink formulation adapted for use in the heat transfer printing of polyester substrates and wherein said film contains the dyestuff of claim 3.

8. A transfer sheet comprising a flexible nontextile substrate in sheet, roll or web form having an offset printed pattern effect thereon, said pattern being formed by a film of dried ink formulation adapted for use in the heat transfer printing of polyester substrates and wherein said film contains the dyestuff of claim 4.

9. An ink composition for use in the preparation of a transfer sheet comprising an ink base including a vehicle and a binder adapted for use in the heat transfer printing of polyester substrates and containing the dyestuff of claim 1.

10. An ink composition for use in the preparation of a gravure printed transfer sheet comprising an ink base including a vehicle and a binder adapted for use in the heat transfer printing of polyester substrates and containing the dyestuff of claim 2.

11. An ink composition for use in the preparation of a gravure printed transfer sheet comprising an ink base including a vehicle and a binder adapted for use in the heat transfer printing of polyester substrates and containing the dyestuff of claim 3.

12. An ink composition for use in the preparation of an offset printed transfer sheet comprising an ink base including a vehicle and a binder adapted for use in the heat transfer printing of polyester substrates and containing the dyestuff of claim 4.

13. In a process for heat transfer printing polyester textiles the improvement comprising transferring a pattern effect carried on a transfer sheet according to claim 5.

14. In a process for heat transfer printing polyester textiles the improvement comprising transferring a pattern effect carried on a transfer sheet according to claim 6.

15. In a process for heat transfer printing polyester textiles that improvement comprising transferring a pattern effect carried on a transfer sheet according to claim 7.

16. In a process for heat transfer printing polyester textiles that improvement comprising transferring a pattern effect carried on a transfer sheet according to claim 8.

17. Polyester fibers dyed by the heat transfer process of claim 13.

18. A polyester substrate colored in black tones by the composition of claim 1.

19. A composition according to claim 1 wherein the brown dye and the blue dye are ground to particle size less than 3 micron.

* * * * *

UNITED STATES PATENT OFFICE
CERTIFICATE OF CORRECTION

PATENT NO. : 4,050,891
DATED : Sept. 27, 1977
INVENTOR(S) : Jacques R. Magill

It is certified that error appears in the above-identified patent and that said Letters Patent are hereby corrected as shown below:

Col. 1, line 57, before " "Transfer " insert --e.--.

Col. 4, line 28, "links" should read --inks--.

Signed and Sealed this

Twelfth Day of September 1978

[SEAL]

Attest:

RUTH C. MASON
Attesting Officer

DONALD W. BANNER
Commissioner of Patents and Trademarks